April 3, 1934.　　　　G. W. MULLEN　　　　1,953,656
METHOD OF PROCESSING
Original Filed July 25, 1929　　4 Sheets-Sheet 1

April 3, 1934.  G. W. MULLEN  1,953,656
METHOD OF PROCESSING
Original Filed July 25, 1929   4 Sheets-Sheet 2

Inventor
George W. Mullen
By his Attorney
Norman T. Holland

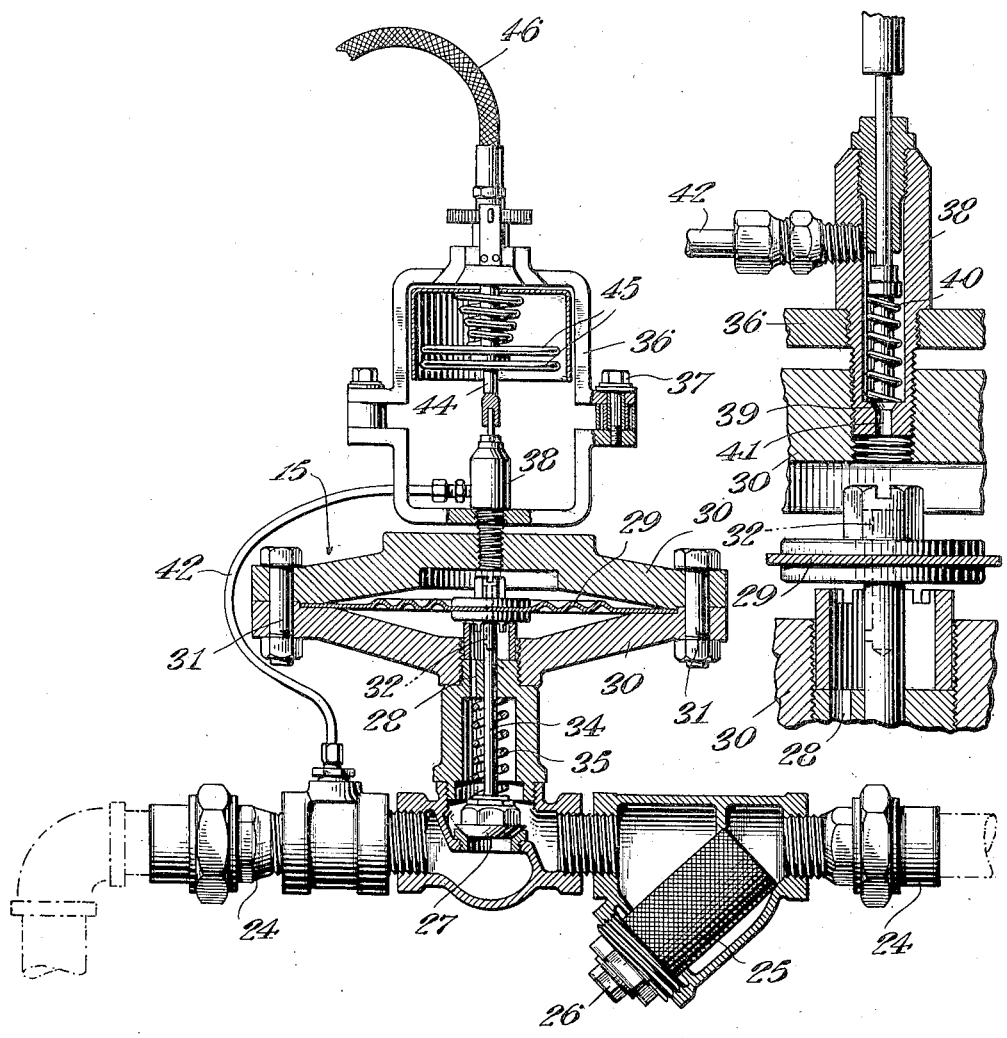

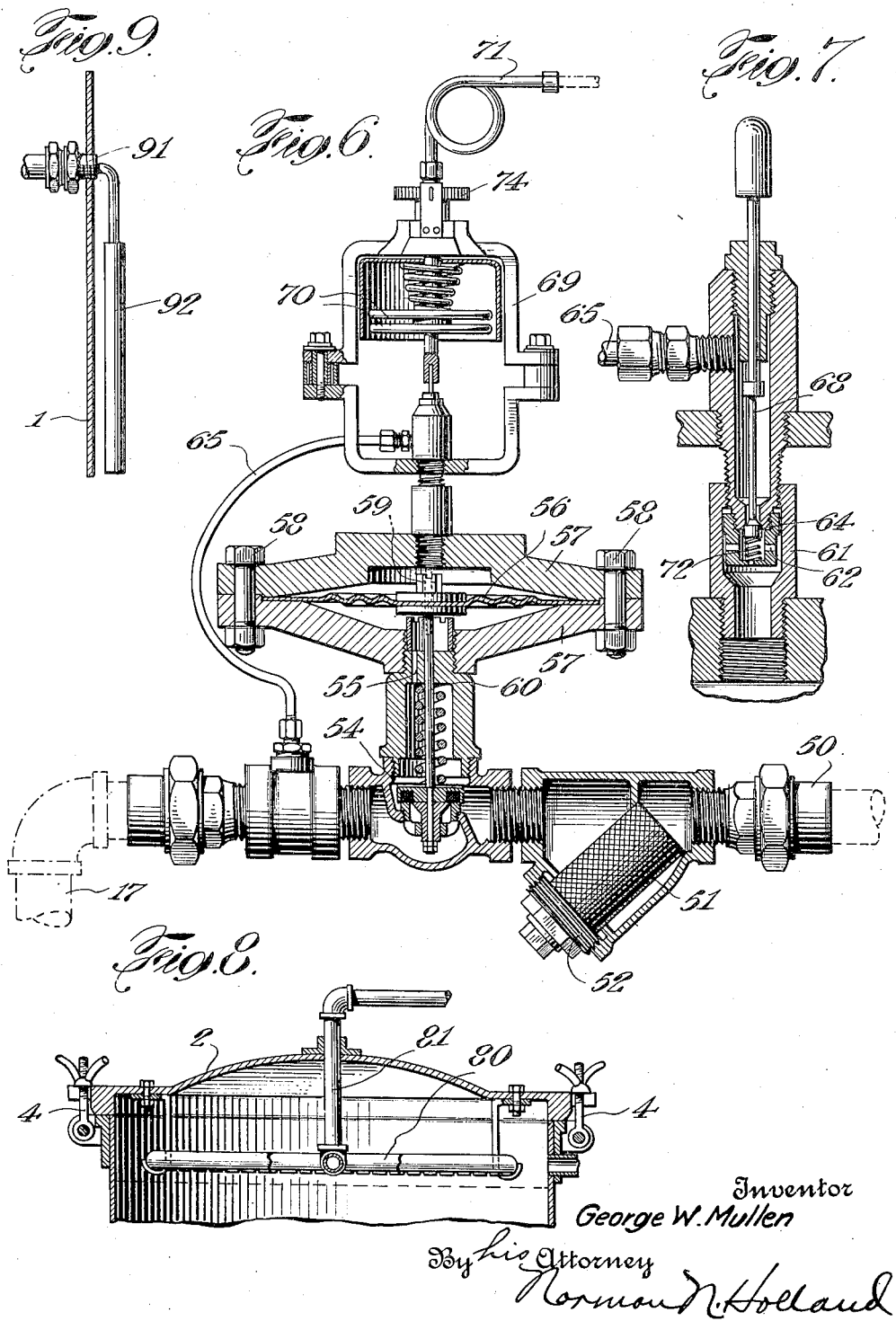

Patented Apr. 3, 1934

1,953,656

UNITED STATES PATENT OFFICE 1,953,656

METHOD OF PROCESSING

George W. Mullen, Indianapolis, Ind., assignor to Anchor Cap & Closure Corporation, Long Island City, N. Y., a corporation of New York Original application July 25, 1929, Serial No. 380,894. Divided and this application January 21, 1931, Serial No. 510,085. In Canada November 18, 1929

16 Claims. (Cl. 99—8)

The present invention relates to a method of sterilizing or processing food products, particularly foods packed in hermetically sealed containers.

It has been found that spoilage of food is caused by living micro-organisms. The only sure way of preventing food products from spoiling is to eliminate such microbes and prevent access of others. The usual way of doing this is to hermetically seal the product and thereafter subject the sealed product to temperatures which will kill the micro-organisms therein. In sterilization, great care is necessary to avoid damaging the food. Temperatures as high as two hundred and forty degrees Fahrenheit are commonly used. Slight increases in temperature are likely to impair the taste or color of the food and slight decreases in temperature are likely to cause incomplete sterilization. Then, too, where glass containers are used, breakage may result from sudden changes in temperature.

Preferably, the containers are sealed with a partial vacuum therein in order to decrease the internal pressure therein when they are heated. In spite of the partial vacuum, the containers, develop, when heated, a substantial pressure which is greater than the steam pressure in the retort. This pressure has to be balanced in order to prevent the covers from popping off. Various methods and apparatus have been devised for sterilization but difficulty has been encountered in maintaining proper temperatures and pressures in the retort at all times; in eliminating breakage of glass containers; and in eliminating the popping off of the caps thereon.

The present invention aims to overcome these difficulties so far as possible by providing an accurate control automatically responsive to the changes of the temperature in the retort for maintaining a constant temperature throughout the retort and by avoiding sudden changes in temperature or pressure due to the introduction of a heating or cooling fluid.

An object of the invention is to provide an effective and efficient method for sterilizing food products packed in hermetically sealed containers.

Another object of the invention is to simplify the sterilizing operation and to minimize the temperature and pressure changes, thereby avoiding breakage, impairment of seals and spoilage of the product.

Another object of the invention is to provide accurate control by utilizing a balanced pressure diaphragm and an automatic valve for relieving the pressure on one side thereof to admit a heating fluid or to permit a part of the heating fluid to escape.

Another object of the invention is to improve the arrangement of the parts whereby accurate control is maintained at all times.

Another object of the invention is to maintain a substantial air space in the top of the retort so that the air entrapped therein may increase in pressure with the increase in temperature thereof to maintain a combined air and steam pressure sufficient to balance the pressure within the container.

Another object of the invention is to avoid sudden changes in the temperature of the air space in the top of the retort and to avoid non-uniform cooling of the contents by adding the cooling fluid at or slightly below the liquid level in the retort and slightly above the receptacles containing the food products.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment has been chosen for purposes of illustrating and describing one method of practicing the invention and is shown in the accompanying drawings, forming a part of the specification, wherein Fig. 1 is a side elevational view, partly in section, illustrating a retort and associated mechanisms embodying the present invention;

Fig. 4 is a sectional view illustrating the automatic temperature control mechanism for admitting steam into the retort;

Fig. 5 is an enlarged sectional view illustrating details of the mechanism shown in Fig. 4;

Fig. 6 is a sectional view illustrating the automatic control for the pressure relief valve;

Fig. 7 is an enlarged sectional view illustrating details of the mechanism shown in Fig. 6;

Fig. 8 is a fragmentary sectional view illustrating a slightly different form of mechanism for admission of the cooling fluid; and Fig. 9 is a detailed view illustrating a convenient way of inserting thermometer bulbs or other temperature responsive devices.

Figure 1:
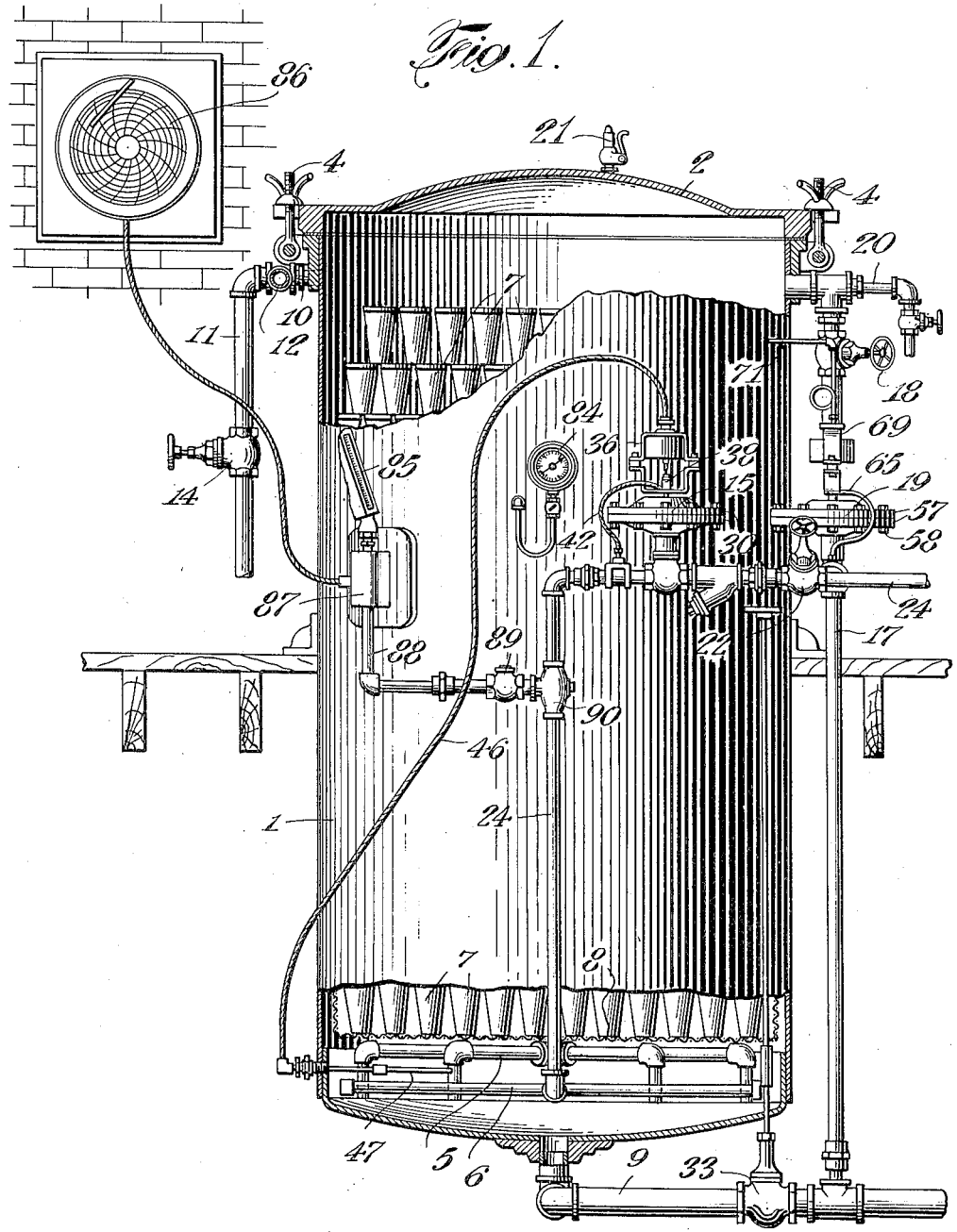

Referring more particularly to the drawings, wherein a preferred embodiment of the apparatus is shown as one means of practicing the method, there is a retort 1 having a cover 2 attached thereto by the hinged lugs 4 in the usual manner. In the bottom of the retort, there is a bracket 5 adapted to support the containers out of contact with the bottom of the retort and a short distance above a cross 6 adapted to admit a heating fluid to the retort. For convenience in handling, the containers 7 are usually placed in baskets 8 and the baskets are stacked one upon another in the retort, the bottom basket resting upon the support 5. The retort is provided with a drain 9 connected to the bottom thereof and with a series of water inlets 10 connected to a water supply 11 through a pipe 12 and controlled by a valve 14.

When the containers are placed in the retort, water may be admitted through the valve 14 and inlets 10 to fill the retort, if a water cook is desired; thereafter steam is admitted through the cross 6 in the bottom of the retort by means of the automatic valve 15 until the contents of the containers 7 have been sterilized. The operation of the valve 15 for controlling the temperature of the contents of the retort will be described hereinafter with more particular reference to Figs. 4 and 5.

During the processing, any excess pressure is relieved through the overflow pipe 17 controlled by the hand operated valve 18 and by the automatic valve 19. The automatic valve 19 will be described in detail hereinafter with particular reference to Figs. 6 and 7. A by-pass 20 is also provided so that the pressure may be relieved manually and the apparatus operated manually if it is so desired. In addition, the retort is provided with a pressure relief valve 21 to afford a greater factor of safety.

Due to the accuracy required in the maintenance of the temperature to which the receptacles are subjected, it is desirable to eliminate the human element as far as possible. Then too, such elimination minimizes the labor required in the operation of the process. In bringing the present system up to its required temperature and holding it at that temperature, the operator opens a valve 22 in the steam pipe 24, permitting the steam to flow into the retort to heat the contents thereof.

The automatic control 15 for the admission of steam to the retort is shown more particularly in Figs. 4 and 5. The steam flows through a pipe 24 passing through a screen or filter 25 which is suitably arranged so that the plug 26 may be removed for cleaning the screen or for replacing it with a new one. Thereafter, steam under pressure flows above the control valve 27, which is shown enclosed in Fig. 4, up through the small conduit 28 to the lower side of a diaphragm 29 having its outer periphery clamped by members 30 which are held in position by bolts 31. The steam on the lower side of the diaphragm 29 tends to open this diaphragm. There is a conduit 32 leading through the upper end of a valve stem 34, permitting the steam to bleed through to the other side of the diaphragm 29, the conduit 32 being substantially smaller than the conduit 28. Normally, the pressure on the two sides of the diaphragm 29 is the same and a coiled spring 35 extending about the valve stem 34, holds the valve 27 in seated position.

Attached to the members 30 is a yoke 36 held in position by bolts 37. The lower end of the yoke 37 has a valve member 38 secured in a threaded aperture in the upper member 30. The valve 39, held in position by a spring 40, controls a conduit 41 leading from the upper side of the diaphragm 29 to a conduit 42 which is connected to the low pressure side of the pipe 24.

It will be understood that when the valve 39 is raised, the pressure above the diaphragm 29 will be immediately relieved because the conduit 41 exhausting the steam is much larger than the conduit 32 supplying it to the upper side of the diaphragm. There being a steam pressure on the lower side of the diaphragm 29 and substantially none on the upper side, the diaphragm flexes upwardly and raises the valve 27 in opposition to the spring 35 to permit steam to flow into the retort until such time as the valve 39 closes the conduit 41; whereupon the steam pressure equalizes on the two sides of the diaphragm 29 and the spring 35 closes the valve 27.

The valve 39, held in its lower position by spring 40, has its valve stem resting against a member 44 which is attached to a bellows 45. The bellows 45 is connected through a flexible conduit 46 to a temperature responsive device 47 which may comprise a tube with a suitable vapor or liquid therein adapted to expand upon being heated, the expanded vapor operating to expand the bellows 45 and close the valve 39. In this manner, steam is permitted to flow into the retort until it reaches a predetermined temperature and is maintained at this temperature by means of the automatic valve 15 until the product has been sterilized and the steam shut off by means of the hand operated valve 22.

While the temperature responsive device 47 may be positioned in any suitable part of the retort, preferably, it is placed directly back of one of the arms of the cross 6 and slightly above it, the position of the thermometer being on the side of the arm opposite from the outlets for the steam. It will be noted also that the steam is injected through a series of small apertures laterally of the retort so that they tend to create circulation in a horizontal direction. This causes a thorough mixing of the steam and water and causes a layer of water of a higher temperature to form at the bottom of the retort. This layer, due to its lower density, rises to the top of the retort, gradually increasing the temperature of the entire contents. The position of the temperature responsive device is such that it is removed slightly from the incoming steam and yet is in the hottest part of the retort so that the incoming steam is cut off immediately when any part of the retort exceeds the predetermined temperature.

Figure 3:
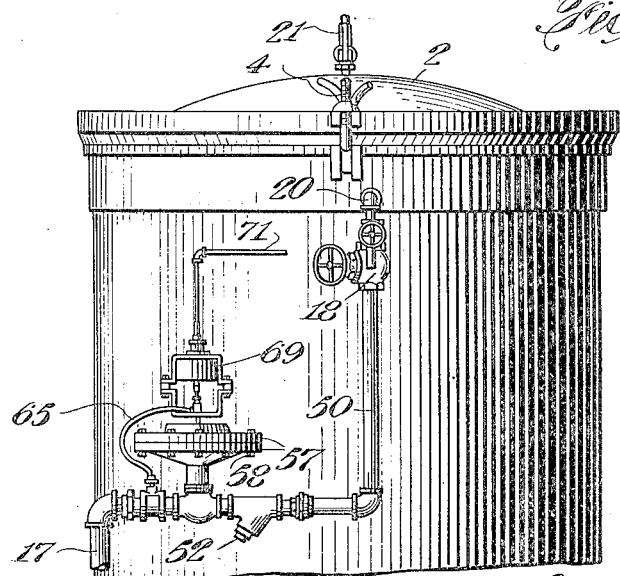
Fig. 3 is a partial side elevational view illustrating the construction.

While the mechanisms just described for admitting steam responsively to the temperature in the retort accurately control the temperature, it is desirable to provide a sensitive mechanism for relieving the pressure when it exceeds a predetermined maximum and also to provide an overflow for excess water where a water cook is used. The automatic mechanism for this purpose is shown more particularly in Figs. 3, 6 and 7. The overflow pipe 17, leading to the drain 9, has attached in a horizontal portion 50 thereof, an automatic valve responsive to the pressure within the retort.

The water flows through a screen 51 which may be removed by means of a plug 52. The water flows above a valve 54 through conduit 55 to the lower side of a diaphragm 56 which is held in position by members 57, secured together by means of bolts 58. A small conduit 59 leads to the upper end of the valve stem 60 to permit the water to bleed into the upper side of the member 57. In this way, there is a balanced pressure, that is, the pressure of the water supply is effective on the respective sides of the diaphragm 56. The upper chamber in the members 57 is connected through a plug 61, a conduit 62 and valve 64 to a relief conduit 65 attached to the low pressure side of the pipe 17 or directly to the drain.

When the valve stem 68 is pressed downwardly, the valve 64 opens and the pressure on the upper side of the diaphragm 56 is relieved by the water flowing through the valve 64 and conduit 65 to the drain, whereupon the diaphragm 56 flexes upwardly opening the valve 54 and letting out the excess pressure, whether it is water, air or steam. The upper end of the block 57 is attached to a yoke 69 which houses a bellows 70, the lower side of which rests upon the upper end of the valve stem 68.

For automatically controlling the valve 64 and, in turn, the valve 54, the bellows 70 is connected through a conduit 71 to any suitable portion of the interior of the retort. The pressure being the same throughout, there is no substantial difference in the place of attachment. The pressure in the retort acts to expand the bellows 70 and to press the valve stem 68 downwardly in opposition to a spring 72. When the pressure is sufficiently great, the valve stem moves downwardly relieving the pressure on the upper side of the diaphragm 56 and permitting the excess pressure in the retort to exhaust through pipe 17 and valve 54. Suitable adjustment means 74 may be provided for adjusting the bellows to determine the pressure necessary to operate the exhaust.

Preferably, the pipe 17 is attached to the upper end of the retort at the desired level of the liquid in the retort when it is filled. This should be four or five inches above the tops of the containers in the retort. In this way, a substantial air space is provided in the upper part of the retort and the air therein expands with the increase in temperature of the contents of the retort, building up a pressure in addition to the steam pressure. This air pressure is adapted to counterbalance, with the steam pressure, any pressure which may form within the food containers due to the heat applied thereto. By having a greater pressure externally of the containers than internally thereof, there is no tendency for the caps to pop off the containers and spoil the contents. This air space provides a variable pressure without necessitating the use of complicated automatic controls for supplying the air to the retort. Further, due to the fact that the overflow is substantially at the upper level of the liquid, there is always assurance that a substantial quantity of air will be trapped in the retort because when the liquid gets above the overflow, water passes through the pipe 17 and the air is trapped in the retort.

In order to avoid water currents and sudden local changes in temperature in the retort, the water is supplied through inlets 10 which are substantially in line with the overflow pipe so that the incoming cold water is supplied substantially at or slightly below the upper level of the hot liquid in the retort. In this manner, the liquid flows along the surface and eventually settles down uniformly in the retort due to its greater density. At the same time, it has no substantial effect on the air and steam space in the upper part of the retort; hence there is no sudden change in the pressure within the retort due to the condensation of steam or reduction in the temperature of the air. The temperature of the air and steam may be more readily reduced than the temperature of water.

In Fig. 8, a slightly different form of mechanism is shown for admitting water to the retort. In this figure, a circular pipe 80 is supported directly from the cover of the retort and water is supplied through a pipe 81 flexibly connected in any suitable manner so that the cover of the retort may be opened and closed. In some instances, this structure may be more desirable than that described hereinbefore.

Various auxiliary devices such as a pressure gauge 84, a thermometer 85, and a recording thermometer 86, may be provided. A suitable pocket 87 may be provided in the side of the retort for housing the thermometers or other auxiliary devices. Preferably, in order to prevent local variations in temperature, the pocket 87, housing the thermometers, is connected by means of a pipe 88 through a check valve 89 to an injector 90 to cause a certain amount of circulation of liquid from the pocket 87 so that the temperature registered by the thermometers will correspond to the temperature throughout the retort.

In Fig. 9 a special type of thermometer is shown wherein the bulb is made from a flexible material such as a thin copper tube to be inserted directly through the side of the retort, as shown at 91, with the free end of the thermometer bent substantially at right angles to the entering end, as shown at 92, to avoid any chance of its coming in contact with the baskets placed in the retort. Such a construction makes it unnecessary to have pockets or other housings for the instruments and facilitates the application of instruments to retorts.

In the operation of the device, and in practicing the method, the retort 1 may be filled with baskets of containers which rest upon the supporting bracket 5; thereafter, the retort is filled with water either before or after the cover 2 is closed. If the cover is closed prior to filling with water, the excess pressure created by filling the retort with water is relieved by means of the exhaust valve 19. When sufficient water has been admitted into the retort to prevent contact of steam with the containers, steam may be admitted through the cross 6 to raise the temperature of the water by opening valve 22. After the retort has been filled and closed, steam continues to flow through the pipe 24 and cross 6 until the contents have reached a predetermined temperature, whereupon the vapor in the temperature responsive device 47 expands the bellows 45 to close the valve 39 in opposition to the spring 40 (see Fig. 5) which permits the pressure on the two sides of the diaphragm 29 to equalize by means of the conduit 32, permitting the steam on the lower side to bleed through to the other side of the diaphragm. When the temperature within the retort has decreased a predetermined amount, the bellows 45 contracts, permitting the spring 40 to open the valve 39, which relieves the pressure on the upper side of the diaphragm 29 through conduit 42, thereby opening the valve 27 and the steam line. In this manner, the temperature may be controlled very accurately.

The pressure within the retort is important due to the fact that it has been found that the steam pressure alone is not sufficient to counterbalance the pressure generated within the receptacles even where they are sealed with a partial vacuum therein. It is, therefore, desirable to maintain an air pressure in the retort in addition to the steam pressure. By connecting the overflow at a suitable point, an air space in the upper part of the retort is assured. The air trapped therein is permitted to increase in pressure, due to its increase in temperature, which builds up a pressure in the retort sufficient to balance the pressure formed in the containers. The pressure may be accurately controlled by means of the mechanism shown more particularly in Figs. 6 and 7. The liquid under pressure in the retort is permitted to flow through the pipe 17, screen 51, and conduit 55 to the lower side of the diaphragm 56. A small conduit 59 permits this pressure to bleed through to the upper side of the diaphragm 56. The upper side of the diaphragm is connected through valve 64 and pipe 65 to the low pressure side of the pipe 17. When the valve 64 is opened, the pressure on the upper side of the diaphragm is relieved and the diaphragm flexes upwardly to open the valve 54 and to relieve the pressure within the retort. The valve 64 is operatively connected by the valve stem 68 to the bellows 70 which is, in turn, connected through a conduit 71 to the interior of the retort. The control valve 64 is very sensitive to the pressure within the retort and provides an accurate control.

Figure 2:
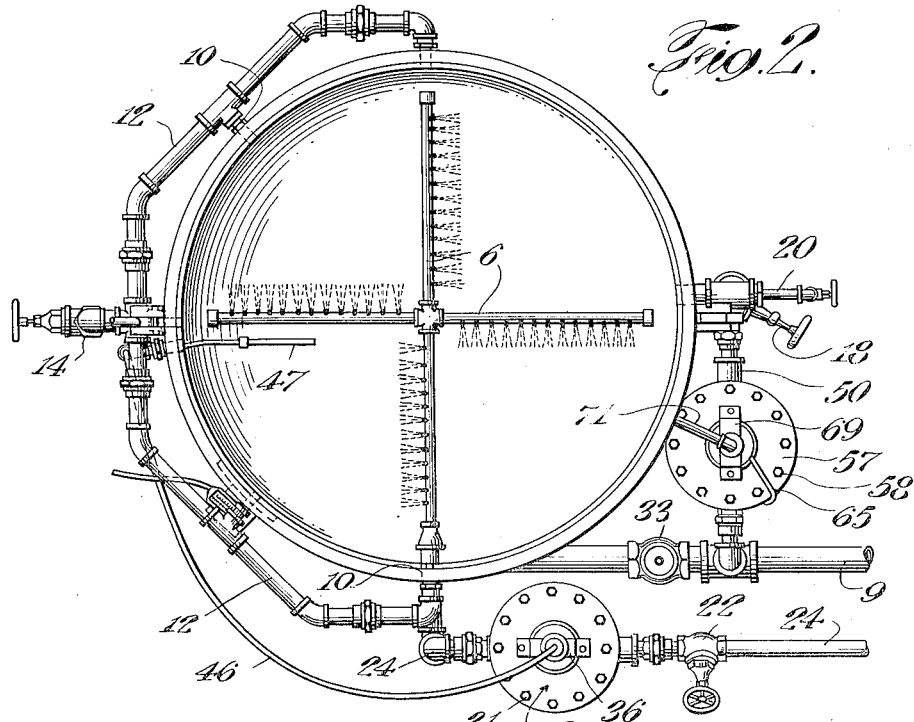
Fig. 2 is a top plan view of the retort with the cover removed and with the support for the receptacles removed.

After the contents of the retort have been cooked or processed, water is admitted through the pipe 11 and inlets 10, in Figs. 1 and 2, or through the pipe 81 and the circular pipe 80, in Fig. 8. These water inlets are positioned substantially at the level of the overflow conduit, that is, at the normal level of the liquid in the retort. By admitting the cooling fluid at this point, it flows over the surface of the liquid without disturbing substantially the temperature of the air space and the cold water settles, due to its greater density, substantially uniformly throughout the retort, thereby avoiding currents and gradually cooling the contents. After the contents have become cool, the water may be drained from the retort by means of the valve 13.

It will be seen that the present process may be practiced with inexpensive apparatus, which is simple in construction and operation, for processing food products particularly those hermetically sealed in glass containers. The temperature is automatically controlled. Due to the valves being operated by pressure relief rather than by the application of pressure, it is possible to maintain temperature limits with far greater accuracy than was possible heretofore. The position of the temperature responsive device is such as to give an accurate reflection of the conditions within the retort and the automatic device quickly responds to changes in temperature. The pressure in the retort is also accurately controlled to counterbalance that formed within the sealed containers. In the cooling operation, the application of the cooling liquid does not materially affect the pressure in the retort.

It will be understood that, while the present embodiment is described more particularly in connection with a water cook, many of its features are equally applicable to a steam cook. As various other changes may be made in the form, construction and arrangements of the apparatus described herein for practicing the method without departing from the spirit of the invention, it is to be understood that all matter herein is to be interpreted as illustrative and not in a limiting sense, and that the invention may be practiced with apparatus other than that described herein.

The present application is a division of a prior application for Method and apparatus for processing, filed July 25, 1929, Serial No. 380,894.

Having thus described my invention, I claim:

1. The method of processing, which method comprises placing food containers within a retort, partially filling the retort with water, closing the retort to trap a substantial quantity of air, injecting steam into the water to heat the water, maintaining substantial pressure within the retort throughout the processing, and controlling the pressure by a relief valve connected to the retort substantially at but below the upper level of the water without increasing the quantity of air in the retort.

2. The method of processing, which method comprises providing a retort with food containers therein, having closure caps sealed thereon, covering the containers with water, providing a substantial air space in the retort above the water, and injecting steam into the water to create a substantial pressure above atmosphere within the retort without substantially changing the quantity of air in the retort during the processing.

3. The method of processing products packed in containers, which method comprises admitting steam within a retort to heat the water and to heat the air space therein so that the air may increase in pressure and combine with the pressure of the steam to balance the internal pressure within the containers, and controlling the pressure within the retort by a relief valve connected substantially at but below the upper level of the liquid without increasing the quantity of air in the retort during the entire processing.

4. The method of processing, which method comprises placing hermetically sealed containers within a retort, filling the retort with water to cover the containers, entrapping a quantity of air in the retort, admitting steam near the bottom of the retort to heat the water, and controlling the temperature of the retort by a device responsive to the temperature of the water located adjacent to the steam inlet but out of the path of the steam.

5. The method of controlling the pressure within a retort, which method comprises entrapping a quantity of air above the liquid and controlling the pressure by a relief valve connected to the retort slightly below the upper level of the liquid therein, thereby to avoid escape of air from the retort, balancing the pressure exerted upon said relief valve by pressure in said retort, and relieving pressure in said retort by releasing pressure on one side of said relief valve.

6. The method of controlling the pressure within a retort, which method comprises utilizing a diaphragm for controlling an outlet from the retort, subjecting both sides of said diaphragm to substantially the pressure within the retort, and operating said diaphragm by releasing the pressure on one side thereof.

7. The method of controlling the pressure within a retort by means of a diaphragm, which method comprises utilizing the pressure within the retort to establish substantially equal pressures on two sides of the diaphragm, and operating said diaphragm by releasing the pressure on one side thereof.

8. The method of controlling the pressure within a retort, which method comprises utilizing a movable member for automatically controlling the outlet from the retort, subjecting both sides of said movable member to the effective internal pressure within the retort and controlling the pressure by relieving the pressure on one side thereof in response to the pressure within the retort.

9. The method of controlling the pressure within a retort, which method comprises utilizing a diaphragm for controlling an outlet from the retort, subjecting one side of said diaphragm to pressure from the retort, providing a bleed for admitting pressure to the other side of the diaphragm, and operating said diaphragm by relieving the pressure on the other side thereof.

10. The method of controlling the temperature within a retort, which method comprises utilizing a diaphragm for controlling the admission of steam to the retort, subjecting both sides of said diaphragm to pressure, and operating said diaphragm by relieving the pressure on one side thereof.

11. The method of controlling the temperature within a retort, which method comprises utilizing a movable member for controlling the admission of steam to the retort, subjecting both sides of said member to pressure from the retort, and operating said member by relieving the pressure on one side thereof.

12. The method of controlling the temperature within a retort, which method comprises utilizing a diaphragm for controlling the admission of steam to the retort, subjecting one side of said diaphragm to pressure from the retort, providing a bleed for admitting pressure to the opposite side of the diaphragm and operating said diaphragm by relieving the pressure on said opposite side.

13. The method of controlling the temperature within a retort, which method comprises utilizing a movable member for controlling the admission of steam, utilizing the pressure within the retort to establish substantially equal pressure on both sides of the movable member, and operating said movable member by releasing the pressure on one side thereof.

14. The method of controlling the temperature within a retort, which method comprises utilizing a diaphragm for controlling the admission of steam to the retort, subjecting both sides of said diaphragm to pressure and operating said diaphragm in response to the temperature within the retort by relieving pressure on one side of said diaphragm.

15. The method of controlling the temperature within a retort, which method comprises utilizing a movable member for controlling the admission of steam to the retort, subjecting both sides of said member to substantially the same pressure and relieving the pressure on one side of said member in response to the temperature within said retort to operate said member.

16. The method of cooling the contents of a closed retort having glass containers immersed in the liquid therein with a substantial space above the liquid having compressed air therein, which method comprises admitting cold water to the retort substantially at the upper level of the liquid but below the level of the liquid therein and above the glass containers, without increasing the quantity of air in the retort, whereby the cooling water is permitted to sink by gravity without creating substantial currents and without cooling the compressed air or steam in the upper part of the retort, thereby maintaining the air pressure substantially constant without increasing the quantity of air.

GEORGE W. MULLEN.